United States Patent [19]
Jarowenko

[11] 3,770,472
[45] Nov. 6, 1973

[54] PROCESS FOR PREPARING MODIFIED STARCH DISPERSIONS

[75] Inventor: Wadym Jarowenko, Plainfield, N.J.

[73] Assignee: National Starch and Chemical Corporation, New York, N.Y.

[22] Filed: May 9, 1972

[21] Appl. No.: 251,691

[52] U.S. Cl............ 106/213, 162/175, 260/233.3 R, 260/233.3 A, 260/233.5
[51] Int. Cl............................................. C08b 27/22
[58] Field of Search.............. 260/233.3 R, 233.3 A, 260/233.5; 106/213

[56] References Cited
UNITED STATES PATENTS

| | | | |
|---|---|---|---|
| 2,995,513 | 8/1961 | Paschall et al. | 210/54 |
| 3,622,563 | 11/1971 | Elizer | 260/233.3 R |
| 3,666,751 | 5/1972 | Jarowenko | 260/233.3 R |

Primary Examiner—Donald F. Czaja
Assistant Examiner—Melvyn I. Marquis
Attorney—Thomas B. Graham

[57] ABSTRACT

A process for preparing dispersions of modified starches is disclosed comprising reacting starch in a dilute aqueous fine colloidal dispersion, at an alkaline pH, in the presence of a cationogenic reagent, with a polyfunctional reagent having groups capable of reacting with both the starch molecule and the cationogenic reagent, whereby the cationogenic reagent is chemically bound to the starch molecule. The resulting cationic starch is useful as a flocculant and pigment retention and strength additive in papermaking. The cationic starches prepared by the process of this invention may be used without isolation and purification as flocculants and pigment retention and strength additives in papermaking.

10 Claims, No Drawings

PROCESS FOR PREPARING MODIFIED STARCH DISPERSIONS

BACKGROUND OF THE INVENTION

This invention relates to the preparation of cationic starches in the form of colloidal dispersions for use as flocculants and paper strength and pigment retention additives. More particularly it relates to the preparation of such cationic starches by reacting starch with a polyfunctional reagent in the presence of a cationogenic reagent.

Cationic flocculating agents and paper additives are well known to the prior art and are described in numerous patents and review articles. (See E. F. Paschall, "Production and Use of Cationic Starches," in R. L. Whistler and E. F. Paschall, Eds., *Starch: Chemistry and Technology*, Vol. II, Academic Press, New York, 1967, pp. 403–422.) It has been known to add various materials, including starch, to the pulp, or stock, during the papermaking process, prior to the formation of the sheet. The purpose of such additives has been mainly to bind the individual fibers to one another, thus aiding the formation of a stronger paper. Furthermore, in the case of those papers which contain added pigments such as titanium dioxide, calcium carbonate, and the like, it has been known to add materials to the pulp for the specific purpose of retaining a greater proportion of such pigments in the paper (rather than have them drain off in the water that is removed during the formation of the sheet). Such additives are often referred to as "pigment retention agents."

According to prior art processes for preparing cationic starches, the flocculants were prepared by bath processes, and isolated and purified by washing and drying. The dried modified starches were then shipped to the location of use where they were redispersed in water and cooked prior to being added to the pulp. The many steps of this procedure result in complexity and relatively high cost.

It has now been found that dispersions of cationic starch flocculants can be prepared in one step by reacting starch in the presence of a cationogenic reagent with a polyfunctional compound capable of reacting both with starch and with the cationogenic reagent so that the cationogenic reagent is bound to the starch.

SUMMARY OF THE INVENTION

It is an object of this invention to provide novel processes for preparing dispersions of flocculants. A further object is to provide such processes by reacting starch, in the presence of a cationogenic reagent, with a polyfunctional bridging compound whereby the cationogenic reagent is bound to the starch molecule.

According to this invention dispersions of cationic starches are prepared by reacting starch in dilute aqueous alkaline colloidal dispersion, in the presence of a cationogenic reagent, with a polyfunctional bridging reagent capable of reacting both with the starch and the cationogenic reagent, whereby the cationogenic reagent is chemically bound to the starch molecule. The dispersions so prepared are useful as flocculants and pigment retention and strength additives in papermaking. The reaction may be carried out by a bath process at temperatures of 25°C. to 130°C. or higher or in a continuous cooker at temperatures of 80°C. to 160°C. or higher.

DESCRIPTION OF THE PREFERRED EMBODIMENTS

The starches which comprise the base material for reaction by the process of this invention may be used in their original native form or in modified form such as is obtained by controlled degradation (thermal, acidic, or oxidative), etherification and/or esterification, provided that they are still capable of further derivatization into cationic derivatives. Thus, starches which have been derivatized with phosphate ester groups can readily be used provided they still retain reactive hydroxyl groups. These starch bases may be derived from any sources including corn, high amylose corn, wheat, potato, tapioca, waxy maize, sago, or rice, as well as from the amylose and amylopectin fractions of starch. The use of the term "starch" is thus intended to include amylaceous substances, whether modified or unmodified, which still retain hydroxyl groups. The amylaceous materials may be in granular form or in cold water swelling form as, for example, pregelatinized starches and dextrins. The starch base selected for the preparation of the cationic starch dispersion will largely depend on the intended end-use of the product.

In the aqueous dispersions of starch used in the novel process of this invention the starch must be dispersed as completely as possible so that the dispersions are thin flowing and free of any gel particles. Satisfactory dispersions are those known as fine colloidal dispersions. Ideally, the starch should be molecularly dispersed, but in any case it should be dispersed so that the molecular aggregates are as small as possible. The practitioner will understand that when starches are reacted with reagents capable of cross-linking the molecules, such as the bridging reagents used in this invention, the larger molecular aggregates will be so internally cross-linked as to become indispersible and hence useless as flocculants. Even a large number of larger colloidal particles in the starch dispersion will cause the resulting flocculant to be inferior. Hence, the preferred starch dispersions are those which approach most closely to the ideal of molecular dispersion. In particular, native starches in granular form must be gelatinized and converted to a fine colloidal dispersion either before the starch is reacted or simultaneously with the reaction, as may occur when the reaction is carried out in a continuous cooker. The concentration of starch in the dispersion is also of importance in obtaining the required degree of dispersion. Native starches may require concentrations of 4.5 percent, by weight, or less, while degraded starches, e.g., waxy maize degraded to a water fluidity of 85, may give satisfactory dispersions at concentrations as high as 30 percent solids. Generally, the most useful and preferred concentrations for the starch dispersions will be less than 4.5 percent solids.

The cationogenic compounds used in the process of this invention are water-soluble compounds which are capable of producing cations when exposed to reagents yielding counter ions, e.g., mineral acids. The cationogenic compounds useful in the process of this invention are those capable of reacting with the bridging compound whereby they become grafted to the starch molecule and provide it with cationic groups. Cationogenic compounds are those bearing nitrogen-, phosphorus-, or sulfur-containing groups which are capable of forming ammonium, phosphonium, or sulfonium ions. Nitrogen containing compounds such as ammonia and amines are especially useful, and of these tertiary amines and amine salts are preferred. Suitable cationogenic compounds are ammonium hydroxide, diethylamine, triethylamine, 4-cyclohexylpiperidine, N-methylpyrrole, N-methyl-piperidine, guanidine, aminoguanidine, and piperidine.

The polyfunctional bridging compounds used in the process of this invention are compounds having at least one functional group reactive with the hydroxyl groups of starch and at least one functional group reactive with the reactive hydrogen atoms or free electrons of the cationogenic reagent in an alkaline aqueous medium. The compounds may be linear, cyclic, heterocyclic, aromatic, or aromatic-aliphatic, or combinations of these as long as they contain at least two reactive groups as described. Preferred bridging compounds are those having a 2–6 atom linear saturated or unsaturated carbon chain having endstanding groups capable of reacting with the hydroxyl groups of starch and with cationogenic reagents either by replacing the active hydrogen atoms or by combining with free electron pairs such as those found in compounds of the formulas $R_3N$, $R_3P$, and $R_2S$. where R represents an organic radical. These reactive groups may be epoxy, halogen, activated double bonds, sulfate, phosphate, methylol groups or groups capable of forming methylol groups by reaction with formaldehyde, e.g., active methylene groups. At least two such groups must be present in the molecule of the bridging compound. The reactive groups may be the same as in the case of 1,4-dichlorobutene, or different as in the case of epichlorohydrin. Compounds such as acrolein having an activated double bond and an aldehyde group may be used as well as inorganic compounds such as phosphorus oxychloride. Preferred bridging compounds are the epoxyhalopropanes such as epichlorohydrin and epibromohydrin, terminal dihaloalkanes with up to six carbon atoms in the chain such as dibromopropane and dibromoethane, dihaloalkenes such as 1,4-dichlorobutene and 1,4-dibromobutene, diepoxyalkanes, and diepoxyalkenes.

For best results amines or other cationogenic reagents are employed in well defined molar ratios with respect to the bridging compounds. The number of reactive groups in commercially available bridging compounds may be two, three, four, or more. The cationogenic reagent is preferably used in equimolar quantity with the bridging compound, but it can be used in greater or lesser amounts. Preferably the molecular ratio of the cationogenic reagent to the bridging compound is such that sufficient functional groups remain for reaction with the hydroxyl groups of the starch.

Since the reaction of this invention is catalyzed by base, the reaction is carried out under alkaline conditions. Furthermore, in some cases one product of the reaction is an acid, hence in these cases an excess of base must be added to neutralize the acid and maintain the required basic condition. Any kind of soluble alkali or alkaline salt can be used including sodium hydroxide, potassium hydroxide, trisodium phosphate, borax, tertiary amines, quaternary amines, and guanidines. The amount of catalyst, which preferably is a strong base such as sodium or potassium hydroxide, depends on the quantity of bridging compound and the number of reactive sites in its molecule. Generally, as many moles of a base such as sodium hydroxide are used as there are reactive sites capable of producing acid in a mole of bridging compound. Such an amount usually assures an alkaline pH throughout the course of reaction. Since the cationogenic reagents also act as acid acceptors, lower concentrations of alkali can be used. This procedure is preferred whenever the cationogenic reagents are tertiary amines, for the quaternary ammonium bases formed in the course of the reaction are not stable in the presence of hot strong alkali.

The polyfunctional reagents used as bridging compounds are also capable of cross-linking the starch molecules. Excessive cross-linking can produce insoluble materials which are not useful as flocculants; hence the amount of cross-linking which occurs during the reaction must be limited.

Cross-linking may be limited by using dilute dispersions of the starch to be derivatized. The native starches must be used in very dilute dispersions since only a small amount of cross-linking need take place to produce an insoluble product. Generally, a concentration of less than 4.5 percent must be used when native starches are derivatized. Lower molecular weight materials can undergo a greater amount of cross-linking before insoluble materials are produced. Hence such materials, e.g., degraded starches, may be reacted at concentrations of up to 30 percent.

When degraded starches are used to produce cationic starches by the process of this invention the reaction may conveniently be carried out by adding the cationogenic reagent and the bridging reagent to an aqueous alkaline fine colloidal dispersion of the starch and allowing the reaction to proceed at a temperature between about 25°C. and about 100°C. for a period of one-fourth to 24 hours. The mixture may then be neutralized and used immediately as a flocculant or paper strength and pigment retention additive.

When native starches are to be reacted by the process of this invention the reaction is conveniently carried out in a continuous cooker. The term "continuous cooker" refers to a type of closed-system equipment through which a starch slurry is passed continuously. When used to prepare starch derivatives according to the process of this invention, the continuous cooker provides a means of heating the reaction mixture rapidly to temperatures of from about 80°C. to about 160°C. or higher, usually by injecting live steam. The continuous cooker process results in essentially simultaneous gelatinization of the starch and its reaction with the derivatizing reagents to introduce the cationic substituent groups. The continuous cooker process allows the starch derivative to be prepared at the site of use and thus makes it possible to have a continuous flow of product available for immediate use.

According to the continuous cooker process the cationogenic reagent and the bridging compound are mixed with a slurry of native starch in water at a pH greater than 10.5 and the mixture is passed through a continuous cooker at a temperature of 80°C. to 160°C. or higher. The starch is gelatinized and derivatized at the same time by this treatment and the reaction mixture may be added just as it comes from the cooker to the wet end of a paper making machine. In some cases it may be more convenient to inject the reagents and/or base catalyst directly into the continuous cooker chamber or into the stream which emerges from the cooker chamber. The time required for the reaction between the reagents and the starch in the cooker chamber may be as short as 2 or 3 seconds, but should not be longer than about 5 minutes, in order to prevent objectionable cross-linking of the starch.

The use of the derivatized starches prepared according to this invention is entirely conventional. However, the use of the reaction mixtures produced by the process of this invention by adding them directly to the wet end of a paper making machine eliminates several of the steps usually required to prepare cationic flocculants and strength additives for use in paper making and thus has economic advantages. The paper made with the starch derivatives of this process is of quality comparable to that obtained when conventional pigment retention and strength additives are used.

The cationic starches produced by the novel process of this invention are useful not only in papermaking but also as flocculants in water and waste treatment.

The invention will be further illustrated by the following examples which are not, however, intended to limit its scope. All parts given are by weight unless otherwise specified.

EXAMPLE I

This example shows the preparation of a starch derivative according to this invention using epichlorohydrin and ammonium hydroxide and its use as a pigment retention agent in papermaking.

To 1940 parts of tap water were added 2.4 parts of sodium hydroxide and 60 parts of amioca starch. To this slurry were added 4.625 parts of epichlorohydrin and 3.0 parts of ammonium hydroxide. The resulting mixture was passed through a continuous cooker at a temperature of 300°F. at a rate such that the residence time in the cooker was 40 seconds. The mixture coming from the continuous cooker had a pH of 11.1 and contained 2.2 percent solids. The mixture was added immediately to a bleached sulfite pulp containing 10 parts of titanium dioxide per 100 parts of paper solids, and paper sheets were made from the pulp. The amount of pigment retained was determined by weighing the samples before and after ashing. The percentage pigment retention is tabulated in Table I.

EXAMPLE II

This example illustrates the preparation of starch derivatives using slightly different quantities of reagents from those used in Example I.

Example I was twice repeated using 3.3 and 3.6 parts of ammonium hydroxide respectively in place of the 3.0 parts used in that example. The resulting products were added to a paper pulp, and samples were prepared and tested as in Example I. Pigment retention results are tabulated in Table I.

EXAMPLE III

This example illustrates the preparation of a starch derivative using diethylamine and 1,4-dichlorobutene.

Example I was repeated using 6.25 parts of 1,4-dichlorobutene and 3.65 parts of diethylamine in place of the epichlorohydrin and ammonium hydroxide of that example.

The pH of the resulting mixture was 11.3 and it contained 2.2 percent solids. The resulting product was tested for pigment retention efficacy by the procedure of Example I. Results are tabulated in Table I.

EXAMPLE IV

This example illustrates the preparation of starch derivatives by the process of this invention using diethylamine and epichlorohydrin.

Example I was repeated using 3.65 parts of diethylamine in place of the ammonium hydroxide of that example. The pH of the resulting product mixture was 10.8 and it contained 2.0 percent solids. The product was tested for pigment retention effectiveness by the procedure of Example I. Results are tabulated in Table I.

EXAMPLE V

This example illustrates the preparation of starch derivatives by the process of this invention using triethylamine and epichlorohydrin.

Example I was repeated using 5.1 parts of triethylamine in place of the ammonium hydroxide of that example. The pH of the resulting product mixture was 11.3 and it contained 2.2 percent solids. The product was tested for pigment retention effectiveness by the procedure of Example I. Results are tabulated in Table I.

EXAMPLE VI

This example illustrates the preparation of starch derivatives by the process of this invention using diethylamine and 1,2-dichloroethane.

Example I was repeated using 4.8 parts of sodium hydroxide in place of 2.4 parts and using 5.0 parts of 1,2-dichloroethane and 3.65 parts of diethylamine in place of the epichlorohydrin and ammonium hydroxide of that example. The pH of the resulting product mixture was 11.4 and it contained 2.2 percent solids. The product was tested for pigment retention effectiveness by the procedure of Example I. Results are tabulated in Table I.

EXAMPLE VII

This example illustrates the preparation of starch derivatives according to this invention using diethylamine, epichlorohydrin, and phosphorus oxychloride.

Example I was repeated using 3.65 parts of diethylamine in place of the ammonium hydroxide and adding 0.40 parts of phosphorus oxychloride. The pH of the resulting product mixture was 10.9 and it contained 2.4 percent solids. The product was tested for pigment retention effectiveness by the procedure of Example I. Results are tabulated in Table I. Table I also includes for comparison a sample of paper made with no pigment retention agent and a sample of a paper made with a cationic starch derivative pigment retention agent made according to the teachings of Caldwell, U.S. Pat. No. 2,813,093.

TABLE I

| Example | Pigment Retention (per cent) at pH | |
|---|---|---|
| | 7.6 | 9.5 |
| I | 47 | 49 |
| IIa | 51 | 49 |
| IIb | 51 | 48 |
| III | 58 | 55 |
| IV | 52 | 51 |
| V | 54 | 52 |
| VI | 45 | 43 |
| VII | 41 | 37 |
| Blank | 18 | 18 |
| Prior art cationic starch | 58 | 59 |

EXAMPLE VIII

This example illustrates the preparation of a cationic starch by reaction at room temperature.

Thirty parts of waxy maize were suspended in 400 parts of water and heated on a boiling water bath for 72 minutes. The resulting fairly thin colloidal dispersion was added to 1,070 parts of agitated cold water and to this mixture was added 2.4 parts of sodium hydroxide over a 5-minute period, followed by 3.66 parts of diethylamine and 6.3 parts of 1,4-dichlorobutene. The resulting dispersion was allowed to react at room temperature for 16 hours with continuous stirring. The dispersion was then acidified to pH 4 with hydrochloric acid. The resulting dispersion of cationic starch was then added in a concentration of 0.25 percent (solids on solids) to paper pulp as in Example I. Pigment retention was determined as in Example I; pigment retention was 55 percent at pH 9.5 and 61 percent at pH 7.6, while a control paper sample made with a commerical cationic starch had pigment retention values of 55 percent at pH 9.5 and 61 percent at pH 7.6.

EXAMPLES IX-XIV

These examples illustrate cationic starches prepared by the process of this invention using a number of different native starches, cationogenic reagents, and bridging compounds.

Mixtures of various native starches with different cationogenic reagents and bridging compounds, as tabulated in Table II, were passed through a continuous cooker at a temperature of about 140°C. and at a rate of 80 ml per minute.

The resulting cationic starch dispersion were added at concentrations of 0.25 percent (solids on solids) to a bleached sulfite pulp containing 10 percent on solids of titanium dioxide and sample sheets were made and tested for pigment retention as in Example I. Results of the pigment retention tests are tabulated in Table III. Likewise the dispersions were added to bleached kraft pulp, sample sheets were made, and the sheets were tested for strength by the Mullen test. Results of the strength tests are also tabulated in Table III.

EXAMPLES XV–XVIII

These examples illustrate cationic starches prepared according to this invention using ethylenediamine as a cationogenic reagent.

Mixtures of tapioca and corn starches with ethylenediamine and various bridging compounds, as tabulated in Table IV, were passed through a continuous cooker at a temperature of about 145°C. and a rate of about 100 milliliters per minute. The resulting cationic starch dispersions were evaluated for pigment retention and strength as in Examples IX-XIV. The results are tabulated in Table V.

TABLE IV

| Ingredient (parts) | Example: | | | |
|---|---|---|---|---|
| | XV | XVI | XVII | XVIII |
| Water | 2940 | 2940 | 2940 | 2940 |
| Sodium | 2.4 | 4.8 | 4.8 | 4.8 |
| Corn Starch | 60 | — | — | 60 |
| Tapioca starch | — | 60 | 60 | — |
| Ethylenediamine | 3.6 | 3.6 | 3.6 | 3.6 |
| 1,4-dichlorobutene | 4.8 | 4.8 | — | — |
| 1,2-dichloroethane | — | — | 5.3 | — |
| Epichlorohydrin | — | — | — | 3.6 |

TABLE V

| Example | % Pigment Retention | | Strength (Mullen Factor) | |
|---|---|---|---|---|
| | pH 7.6 | pH 6.0 | at 0.5% | at 1.5% |
| XV | 41 | 48 | 1.40 | 1.35 |
| XVI | 51 | 54 | 1.39 | 1.43 |
| XVII | 38 | 48 | 1.32 | 1.35 |
| XVIII | 41 | 70 | 1.39 | 1.37 |
| Control (commercial cationic starch) | 53 | 73 | 1.42 | 1.56 |
| Blank | 9.0 | 40 | 1.32 | — |

EXAMPLES XIX and XX

These examples illustrate cationic starches prepared according to this invention using derivatized starches as base materials.

Preparation of derivatized starches:

A. About 100 parts of corn starch were suspended in 130 parts of water containing 6 parts of sodium dihydrogen phosphate. The pH of this mixture was adjusted with dilute sodium hydroxide to 5.0. The mixture was agitated for about 30 minutes, filtered, and the starch cake was dried to a moisture content of about 3 percent. The dry starch was powdered and heated at 130°C. for 3.5 hours. A sample was washed with water until free of inorganic phosphate and was found to have about 0.15 percent phosphorus on a dry basis.

B. About 100 parts of wheat starch was suspended in 125 parts of water. To the slurry were added 10 parts of sodium sulfate and 2 parts of a 50 percent sodium hydroxide solution, followed by 5 parts of propylene oxide. The resulting mixture was agitated at 40°C. for

TABLE II

| Ingredient (parts) | Example | | | | | |
|---|---|---|---|---|---|---|
| | IX | X | XI | XII | XIII | XIV |
| Water | 2,940 | 1,940 | 2,400 | 2,940 | 2,940 | 2,940 |
| Tapioca starch | 60 | | | | | 60 |
| Potato starch | | 60 | | | | |
| Corn starch | | | 100 | 60 | 60 | |
| Sodium hydroxide | 6.0 | 4.8 | 4.8 | 6.0 | 4.0 | 4.0 |
| 4-cyclohexyl-piperidine | 8.4 | | | | | |
| N-methylpiperidine | | 4.9 | | | | |
| N-methylpyrrole | | | 6.0 | | | |
| Aminoguanidine | | | | 6.0 | | |
| Guanidine hydrochloride | | | | | 2.4 | 4.8 |
| 1,4-dichlorobutene | 6.5 | | | 7.0 | | |
| Epichlorohydrin | | 4.5 | 6.9 | | 2.4 | 4.8 |

TABLE III

| Example | % Pigment Retention | | Strength (Mullen factor) | |
|---|---|---|---|---|
| | Sample at pH 7.5 | Blank | Sample at 0.5% / 1.5% | Blank |
| IX | 53 | 14 | 1.42 / 1.57 | 1.29 |
| X | 47 | 12 | 1.39 / 1.45 | 1.23 |
| XI | 42 | 12 | 1.44 / 1.42 | 1.23 |
| XII | 42 | 26 | 1.35 / 1.37 | 1.23 |
| XIII | 43 | 26 | 1.34 / 1.34 | 1.23 |
| XIV | 45 | 26 | 1.32 / 1.33 | 1.23 |
| Control (commercial cationic starch) | 53 | 12 | 1.50 / 1.63 | 1.23 |

24 hours. The mixture was then acidified to pH 6.5, filtered, and the filter cake was washed until salt free and dried.

Reactions and Evaluations:

The derivatized starches prepared above were reacted and dispersed by passing the compositions tabulated in Table VI through a continuous cooker at a rate of about 100 milliliters per minute.

TABLE VI

| Example | XIX | XX |
|---|---|---|
| Water | 2450 parts | 2450 |
| Starch derivative A | 50 | — |
| Starch derivative B | — | 50 |
| 2,6-dimethylpiperidine | 4.0 | 4.0 |
| Epichlorohydrin | 4.1 | 4.0 |
| Sodium hydroxide | 4.5 | 4.5 |

The resulting modified starch dispersions were added in a concentration of 0.25 percent (solids on solids) to paper pulp as in Example I, and pigment retention was determined as in that example. The pigment retention of the paper made with the products of these examples was much greater than that of paper made with a control flocculant made by passing a slurry of starch containing sodium hydroxide but not the derivatizing reagents through a continuous cooker.

In summary, this invention provides a novel and improved process for preparing dispersions of cationic starches useful as flocculating agents.

Deviations may be made in procedures, proportions, and materials without departing from the scope of this invention.

What is claimed is:

1. A process for preparing a dispersion of a cationic starch for direct use in paper pulp comprising
reacting colloidally dispersed starch in a alkaline aqueous medium at a concentration not exceeding 4.5 percent, by weight, for a native starch, and not exceeding 30 percent, by weight, for a degraded starch,
in the presence of a water-soluble cationogenic compound capable of forming ammonium, phosphonium, or sulfonium ions,
with a polyfunctional compound having at least one functional group reactive with starch and at least one functional group reactive with said cationogenic compound, to form a reaction product,
whereby said cationogenic compound is chemically bound to the starch molecule.

2. A process according to claim 1 wherein the reaction is carried out in a continuous cooker at a temperature of between about 80°C. and about 160°C. with a residence time in said cooker of no longer than about 5 minutes.

3. A process according to claim 1 wherein said polyfunctional compound is epichlorohydrin.

4. A process according to claim 1 wherein said cationogenic reagent is diethylamine.

5. A process according to claim 1 wherein said polyfunctional compound is 1,4-dichlorobutene.

6. A cationic starch dispersion for direct use in paper pulp prepared by
reacting colloidally dispersed starch in an alkaline aqueous medium at a concentration not exceeding 4.5 precent, by weight, for a native starch, and not exceeding 30 percent, by weight, for a degraded starch,
in the presence of a water-soluble cationogenic compound capable of forming ammonium, phosphonium, or sulfonium ions,
with a polyfunctional compound having at least one functional group reactive with starch and at least one functional group reactive with said cationogenic compound, to form a reaction product,
whereby said cationogenic compound is chemically bound to the starch molecule.

7. A cationic starch dispersion according to claim 6 wherein said cationogenic reagent is piperidine.

8. A cationic starch dispersion according to claim 6 wherein said polyfunctional compound is epichlorohydrin.

9. A cationic starch dispersion according to claim 6 wherein said polyfunctional compound is 1,4-dichlorobutene.

10. A cationic starch dispersion according to claim 6 wherein said cationogenic reagent is diethylamine and said polyfunctional compound is 1,4-dichlorobutene.

* * * * *